(12) United States Patent
Yao (10) Patent No.: US 6,754,404 B2
(45) Date of Patent: Jun. 22, 2004

(54) TRANSVERSE-PRESSURE-CONTROLLED FIBER DEVICES

(75) Inventor: X. Steve Yao, Diamond Bar, CA (US)

(73) Assignee: General Photonics Corporation, Chino, CA (US)

(*) Notice: Subject to any disclaimer, the term of this patent is extended or adjusted under 35 U.S.C. 154(b) by 0 days.

(21) Appl. No.: 10/316,633

(22) Filed: Dec. 10, 2002

(65) Prior Publication Data

US 2003/0081874 A1 May 1, 2003

Related U.S. Application Data

(62) Division of application No. 09/676,554, filed on Sep. 30, 2000, now Pat. No. 6,493,474.

(51) Int. Cl.[7] .................................................. G02B 6/00
(52) U.S. Cl. .............................. 385/11; 385/27; 385/9; 359/497
(58) Field of Search ............................ 385/1, 9, 11, 14, 385/16, 27, 141, 147; 359/256, 494, 497, 900

(56) References Cited

U.S. PATENT DOCUMENTS 6,493,474 B1 * 12/2002 Yao .............................. 385/11

* cited by examiner

*Primary Examiner*—Phan T. H. Palmer
(74) *Attorney, Agent, or Firm*—Fish & Richardson P.C.

(57) ABSTRACT

Implementations of a polarization control method and apparatus are provided. In one implementation, a device uses super-polished squeezing surfaces to apply pressure against a polyimide coated fiber thereby minimizing micro-bending effects that cause losses in the fiber. Special control circuitry may be used to maintain a driving source of piezo-electrics that control the squeezing surfaces at a resonant frequency, thereby minimizing the voltages needed to drive the piezo-electrics.

4 Claims, 7 Drawing Sheets

TRANSVERSE-PRESSURE-CONTROLLED FIBER DEVICES

CROSS-REFERENCE TO RELATED APPLICATIONS

This application is a divisional application of and claims priority to U.S. application Ser. No. 09/676,554, filed on Sep. 30, 2000 now U.S. Pat. No. 6,493,474.

BACKGROUND OF THE INVENTION

Fiber optic network equipment and test equipment often require careful control of the polarization of light propagating in a fiber optic cable. One method of obtaining such polarization control is to insert a series of wave plates in the light path of the propagating light. However, utilizing wave plates typically involves directing light out of the fiber and redirecting the polarization corrected light back into an optical fiber. Such techniques are complicated and require careful alignment. Redirecting the polarization corrected light back into the optical fiber also results in back reflections and insertion losses.

In order to control the polarization of light in a fiber without the losses and alignment problems associated with wave plate systems, several patents describe a technique to control the polarization of light propagating in a fiber by applying pressure to an optical fiber. These references include U.S. Pat. No. 4,988,169 entitled "Optical Signal Control Method and Apparatus" issued to Neigle G. Walker; U.S. Pat. No. 4,753,507 entitled "Piezoelectric Loading Housing and Method" issued to Ramon P. DePaula et al; and U.S. Pat. No. 5,903,684 entitled "Independent Control of Normally Interdependent Light Transmission Characteristics of Optical Fiber" issued to Robert M. Payton. All three patents are hereby incorporated by reference.

Each of the three references describes a polarization compensation system that utilizes a plurality of fiber squeezers. Each fiber squeezer squeezes a different segment of the optical fiber. It is known that applying a transverse compressive force to a length of optical fiber changes the refractive index of the fiber via a photoelastic effect and introduces a stress induced birefringence. By applying transverse pressure along different directions, each fiber squeezer rotates the polarization of light propagating in the optical fiber about orthogonal axes on a Poincare sphere.

Although the principles of using pressure on a fiber to control polarization are well documented, one problem with building such systems is high signal losses caused by fiber squeezing. Typical activation induced losses in such systems are in the 0.5 dB range. The activation-induced loss measures the addition insertion loss caused by the activation of the device and is defined as the difference of the maximum and minimum insertion loss of the device at all activation conditions. This specification is particularly important because all polarization-impairment compensation schemes involve a feedback signal to activate the polarization controller. The activation-induced loss causes errors in the feedback signal and directly degrades the performance of the compensation apparatus. When a polarization controller is used in an instrument for measuring the polarization dependent loss (PDL) of optical components, the activation-induced loss limits the resolution and accuracy of the measurement. Controller PDL also contributes to error in the feedback system for PDL measurements and complicates the design of compensation hardware and software.

Current pressure based polarization controllers also suffer reliability problems because the applied pressure causes fiber fracturing and breakage. For example, the DePaula reference (507 patent) states that at room temperature, fiber fracturing begins when the fiber is deformed by only 1 percent. For example, a 125 micrometer glass fiber begins fracturing when the deformation is only 1.25 micrometers. To control fiber breakage and minimize losses, Shimizu reference describes coating the fiber with metal prior to the application of pressure. However, uniform metal coatings are not easily reproducible in production.

Another problem with prior art fiber squeezing systems is that high voltages are needed to drive the piezoelectric actuators that move the squeezers. Thus the driver circuits of the piezoelectric actuators require large power supplies and transformers to "step up" the voltages. These additional components increase the size and cost of the polarization controllers.

Thus an improved system for minimizing activation losses, minimizing fiber breakage and reducing the power needed to drive the piezoelectric is needed.

BRIEF SUMMARY

The present invention describes an improved polarization control system for controlling the polarization of light in an optical fiber. The systems uses various mechanisms such as piezoelectric drivers to control a fiber squeezing surface that applies a transverse compressive force to a segment of optical fiber. In one embodiment of the invention, the piezoelectric driver is driven at a resonance frequency to minimize the voltages needed to operate the piezoelectrics. The fiber-squeezing surface are preferably super polished to reduce irregularities below 100 microns. To minimize the possibility of optical fiber breakage, a polyimide coating is applied on the cladding of the fiber.

DETAILED DESCRIPTION OF THE INVENTION

Figure 1:
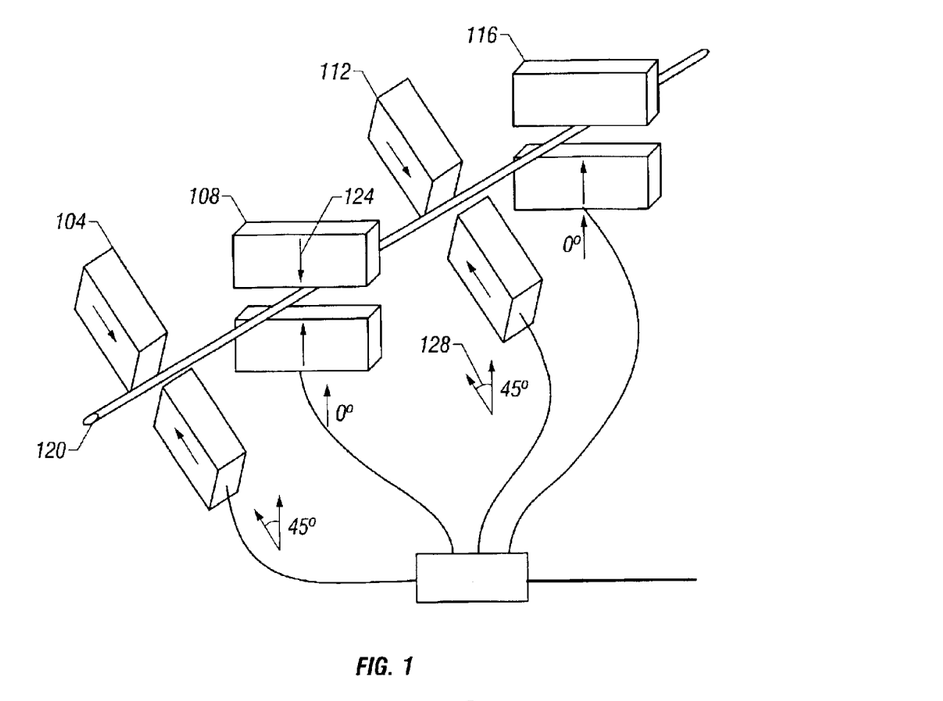
FIG. 1 shows a plurality of fiber squeezers oriented to vary the polarization of light transmitted through an optical fiber.

FIG. 1 shows a series of fiber squeezers 104, 108, 112, 116 positioned along an optical fiber 120. Each fiber squeezer is typically oriented such that the transverse compressive force applied in a first direction 124 by a first fiber squeezer 104 forms an angle 128 with the transverse compressive force applied in a second direction 132 by an adjacent second fiber squeezer 108. Both transverse compressive forces are applied in planes that are orthogonal to a propagating direction of light in optical fiber 120.

When a fiber squeezer applies pressure to a fiber, a linear birefringence is induced in the fiber. The slow axis of the birefringence is oriented in the direction of the applied pressure and typically increases linearly with the applied force. The pressure-induced birefringence can vary from 0 to $\pi/2$. The applied force also changes the optical path length and induces a phase change in the light propagating in the fiber. More specifically, the retardation of light with a polarization oriented along the slow axis of the birefringence may be retarded from 0 to 2 pi with respect to light with a polarization oriented perpendicular to the slow axis.

By adjusting the pressure of each fiber squeezer 104, 108, 112, 116, the polarization of the light propagating in the fiber can be rotated along a Poincare sphere as described in several prior art references such as the previously incorporated by reference '169 patent. A suitable control system (not show) may monitor the polarization input to and output by the polarization controller 100 to regulate the amount of pressure applied by each fiber squeezer 104, 108, 112, 116. In general only two fiber squeezer such as fiber squeezer 104, 108 would be sufficient to control the polarization of the optical signal guided in the fiber, however, in practice additional fiber squeezers are used to make the polarization controller "reset" free. Resetting the polarization controller causes temporary disruption of the output polarization state and is undesirable in systems where continuous polarization tracking is required In prior art implementations, the relative orientation angle between two adjacent fiber squeezers is typically set to 45 degrees. However, in the present invention, other orientations may be used.

Figure 2:
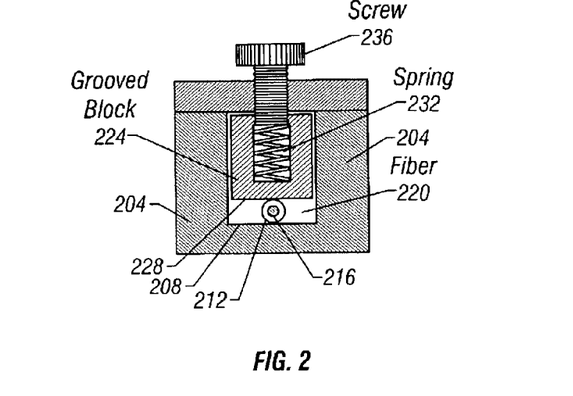
FIG. 2 shows an expanded cross sectional view of one embodiment of a fiber squeezer coupled to a power source.

FIG. 2 illustrates a cross section of a fiber squeezer such as fiber squeezer 104. In FIG. 2, a fiber holder 204 incldues an ultra smooth flat surface 208 that supports a first side, typically a polyimide coating 212 surrounding a cladding 216 of optical fiber 220. A pressure block 224 including a second ultra smooth surface 228 presses against an opposite side of the poly-imide coated optical fiber 220.

Various mechanisms may be used to control the pressure applied by pressure block 224 to optical fiber 220. In a first embodiment, a spring 232 maintains a constant force on pressure block 224. The spring 232 typically has a spring constant K such that the force applied by the pressure block is equal to F=KX where X is the distance by which the spring is compressed.

The pressure applied by the spring is adjusted by changing the compression of spring 232. In one embodiment, pressure on spring 232 is controlled by a screw 236. Threads on screw 236 interlock with threads in holder 204 such that rotation of screw 236 moves the screw in and out of holder 204. Rotation of screw 236 in a predetermined direction increases the compression of spring 232 and causes pressure block 224 to press harder against optical fiber 220. The increase in pressure further changes the index of refraction and increases the birefringence of fiber core 216.

In a second embodiment of the invention, a piezo-electric actuator replaces screw 236 in moving pressure block 224.

Figure 3A:
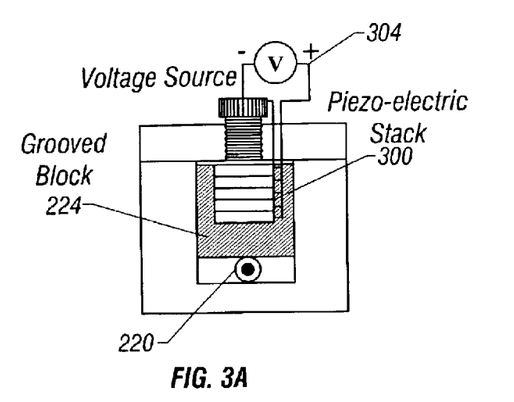
FIGS. 3A and 3B show a stack of piezo-electrics used in an embodiment of the fiber squeezer.
Figure 3B:
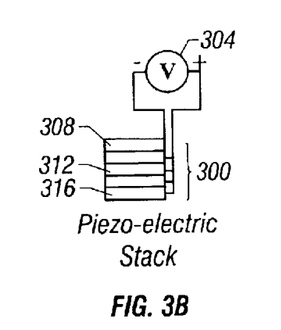

FIGS. 3A and 3B illustrate a piezo electric stack 300. A electrical source such as voltages source 304 provides power to stack 300. The stack includes piezo electric elements 308, 312, 316. Altering the voltage applied across stack 300 changes the displacement of stack 300. Substituting screw 236 with piezo electric stack 300 allows a user to use the output voltage of voltage source 304 to control the force applied by pressure block 224.

One difficulty with piezo electric elements such as elements 308, 312, 316 is that significant voltages are typically needed to achieve the desired displacement. Often the voltage requirements may exceed 50 volts. Generating these relatively high voltages in solid state systems involves transformers and powerful power supplies. However, by setting and maintaining the driving frequency of voltage source 304 at the resonant frequency of piezo electric stack 300, the necessary voltage can be significantly reduced. It has been found that by driving the piezoelectrics at a resonant frequency, the minimum driving voltages can be reduced to below 10 volts and in best case situations, to below 2 volts. These low voltage makes it possible to drive the piezo-electric stack using low cost commercially available integrated circuits.

Figure 4:
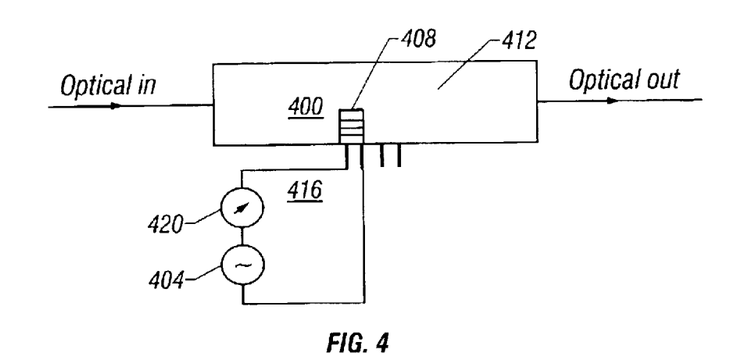
FIG. 4 shows a control system for maintaining the frequency output of a power supply at the resonant frequency of the piezo-electric.

In order to maintain the output frequency of the power source driving the piezo-electric stack at the resonant frequency, a driving circuit current monitor is illustrated in FIG. 4. In the driving circuit current monitor of FIG. 4, a variable frequency power source 404 is coupled to at least one piezo-electric 408 in polarization scrambler 412 via circuit loop 416. A control circuit 420 monitors the power output of power source 404, typically by monitoring either the current and/or the voltage of the output.

Figure 5:
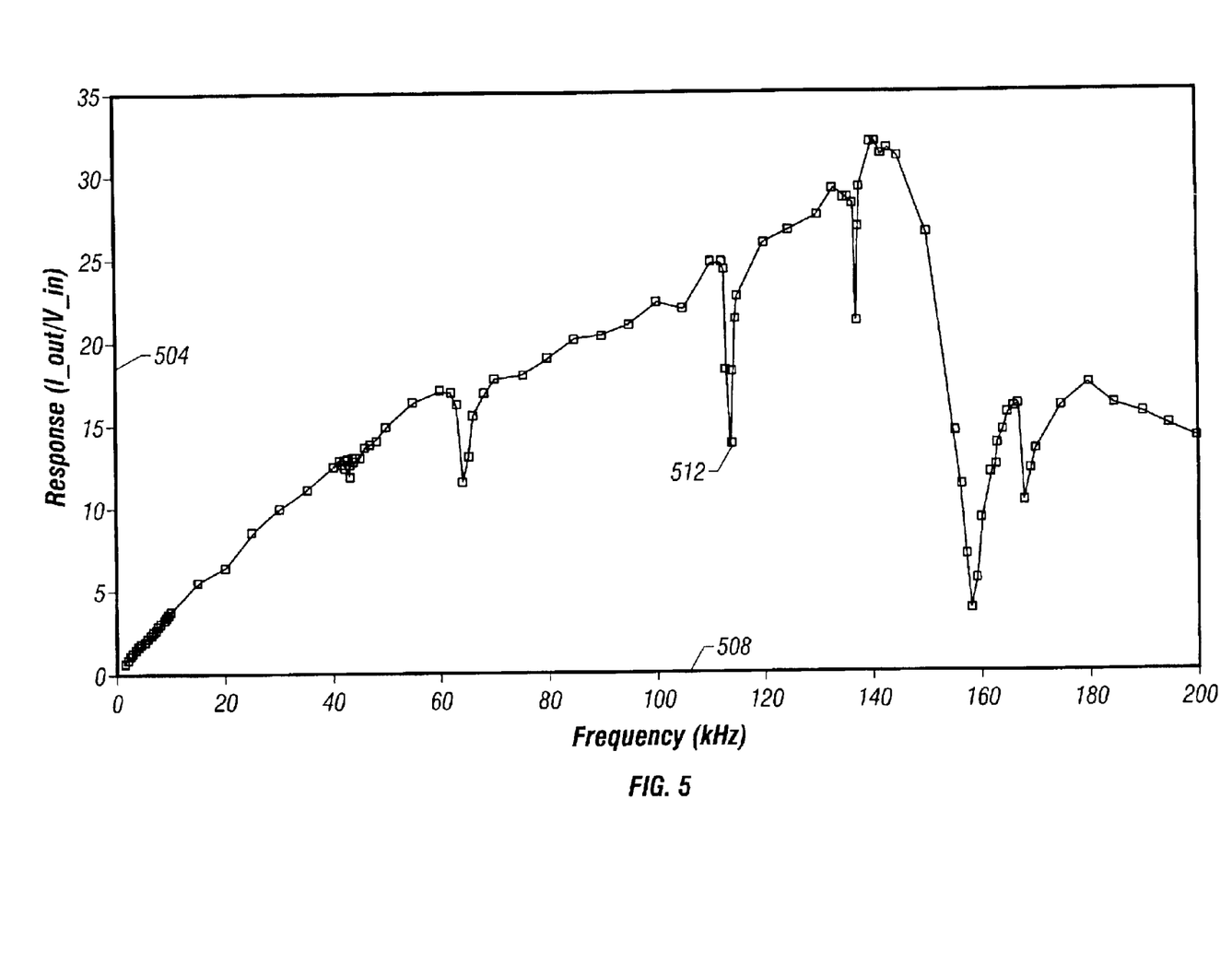
FIG. 5 shows a graph of current output by the power supply versus frequency used to drive a piezo-electric.

The current used by piezo-electric 408 typically varies as the frequency output by power source 404 changes. FIG. 5 graphs current output by power source 404 when powering a piezo electric along vertical axis 504 versus frequency of the power supply output along horizontal axis 508. The minimal point 512 is the resonant frequency of piezoelectric 408. When the output of power source 404 is at the resonant frequency, the current requirements of piezoelectric 408 are minimized. Thus in one embodiment of the invention, control circuit 420 dithers the frequency of the power signal output by power source 404 to determine the resonant frequency of the piezo-electric and maintains the output frequency of power source 404 at the determined resonant frequency. When the resonant frequency changes due to changing environmental parameters such as temperature, control circuit 420 automatically adjusts the frequency output of power source 404 to track the changing resonant frequency.

Figure 6A:
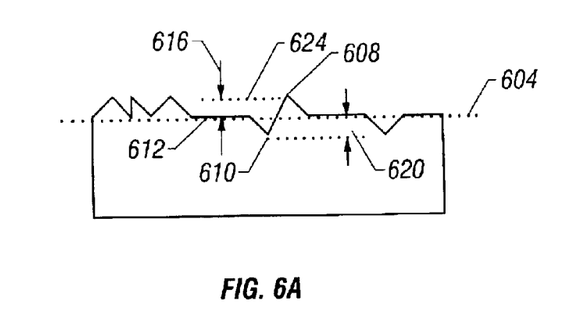
FIGS. 6A and 6B show an expanded view of a squeezing surface of the fiber squeezer.
Figure 6B:
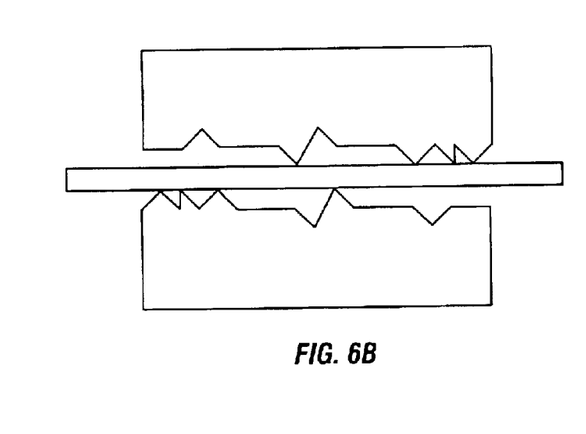
Figure 7:
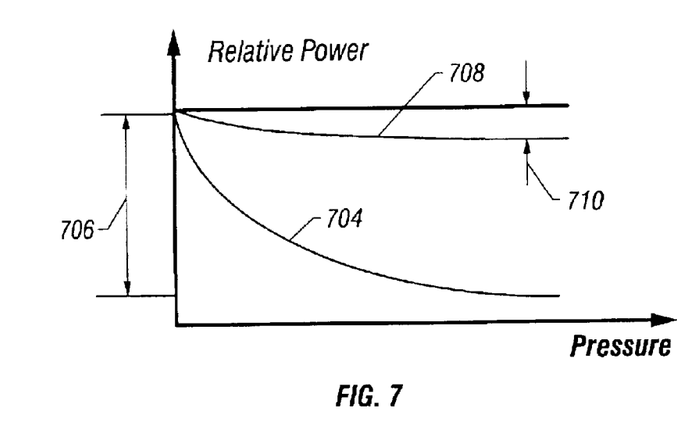
FIG. 7 is a graph that shows the output when pressing a super-polished fiber squeezer versus the output when pressing with a regular polished fiber squeezer.

FIGS. 6A and 6B show an expanded view of a squeezing surface 604 of the fiber squeezer 200. Traditionally, such fiber squeezing surfaces would have irregularities including protrusions 608 and indentations 610 that deviate from a plane 612 of a smooth surface. Each protrusion has a height 616 that represents the shortest distance from the top 624 of the protrusion to the plane 612 of the smooth surface. Likewise, each indentation has a depth 620 from the bottom of the indentation to plane 612. It has been discovered that such irregularities, and particularly the protrusions, are largely responsible for the activation losses when squeezing surface 604 presses against the fiber. In particular, the protrusions produce microbending in the fiber surface that results in light loss. Trace line 704 of FIG. 7 shows the drop 706 in light intensity propagating in the fiber due to microbending effects when an untreated squeezing surface applies pressure.

In order to reduce microbending effects, the fiber squeezing surface is treated by one of several techniques to generate a "super smooth" surface. One method of generating such a technique is by superpolishing. Typically such a superpolish is accomplished using a fine grade lapping film or polishing compound made of abrasive particles. Such particles may include diamond, silicon carbide, or aluminum oxide. Alternative methods of superpolishing a surface are also available. For example, an electro-polish technique may be used to obtain mirror-type finished metal surfaces. Yet another method of treating the surface of the fiber squeezer is to use adhesives or similar chemicals to fill in the cracks on the surface. When cured, the adhesive forms a smooth hard coating and thus reduces the roughness of the surface. Such lapping films or compounds are traditionally used to polish mirrors, lenses, and fine finish metals to create a super smooth surface.

The objective of the superpolish is to reduce the height 616 of the highest protrusion to less than 100 microns and preferably to a height of less than 50 microns. Thus when the super polished fiber squeezing surface is pressed against the fiber, the "roughness" or maximum deformation of the fiber surface from plane 612 of the smooth surface is less than 100 microns. Trace line 708 of FIG. 7 shows a drop 710 in light intensity in the fiber when the super polished fiber squeezing surface applies pressure.

The difference in loss between drop 710 and drop 706 represents the improvement in activation loss due to super-polishing the squeezing surface. By reducing protrusions to less than 100 microns, activation losses can be reduced to 0.01 dB. Further polishing can further reduce activation losses. In the laboratory, super polishing has reduced activation losses below 0.002 dB.

Figure 8:
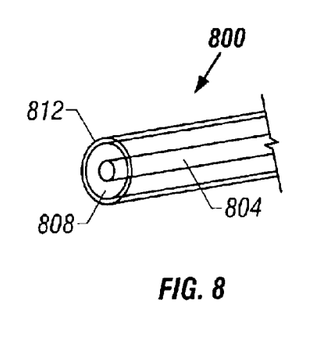
FIG. 8 shows a cross sectional view of a coated fiber for use in one embodiment of the invention.

FIG. 8 shows a cross sectional view of a coated fiber 800 for use in one embodiment of the invention. Fiber 800 includes a central core 804, a cladding 808, and a protective polyimide coating 812 (typical fiber generally has a soft crylite coating). The fiber cladding typically has a diameter of approximately 125 micrometers. Microcracks can often found on the surface of the fiber cladding and these cracks are responsible for fiber breakage under stress. In particular, when pressure induced fiber stress occurs, fiber breakage starts from one or more microcracks and propagates across a fiber cross section. In order to strengthen the fiber, a polyimide coating 812 is applied around the fiber cladding. Alternatively, other chemical coatings may also applied to the fiber surface to seal the microcracks and increase fiber's strength. Such coating materials include chlorinated polydimethylsiloxane, monometric octadecylsilane, □-chloroethylsilsesquioxane, and methylsilsesquioxane. The coating thickness range from nonometers to 10 microns.

Prior art polyimide coatings are used to increase the operational temperature range of the fiber. However, it has been discovered that the polyimide also effectively seals the micro-cracks on the surface of the fiber. Sealing the micro-cracks significantly reduces the probability of stress induced breakage. Compared with prior art metal coating, the polyimide coating is thin, uniform, low cost, and environmentally more stable. Coating uniformity is important because coating non-uniformity induces microbending in the fiber resulting in high activation losses. A few molecular layer of carbon around the fiber cladding may further increase the fiber durability under stress. A typical thickness of the poly-imide coating is between 10 and 25 micrometers. Such polyimide coated fibers are commercially available from Lucent Technologies of Avon, Conn. and sold under the trade name PYROCOAT. These polyimide coated fibers are typically sold for high temperature applications.

Another advantage of the polyimide coated fiber is its small diameter and hard surface. A regular fiber generally includes a core, a cladding, and a soft protective buffer, with a typical diameter of 250 microns. The soft protective buffer dampens the pressure applied to the fiber and thus reduces the fiber squeezing effect. Squeezing induced birefringence in an optical fiber is inversely proportional to the fiber diameter, the small diameter. Thus the small diameter (typically 160 microns) of the polyimide coated fiber is very sensitive to the squeezing induced birefringence. The high sensitivity reduces the power requirements of the fiber squeezer. In particular, the half-wave voltage of the polyimide enhanced fiber squeezer may be reduced by approximately 36%.

Figure 9A:
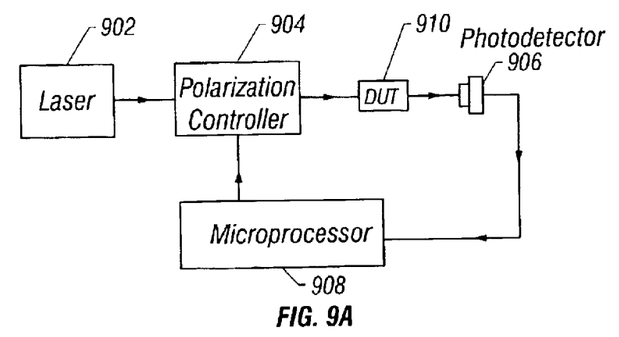
FIGS. 9A and 9B show embodiments of systems to measure polarization dependent loss using fiber squeezer polarization controllers.
Figure 9B:
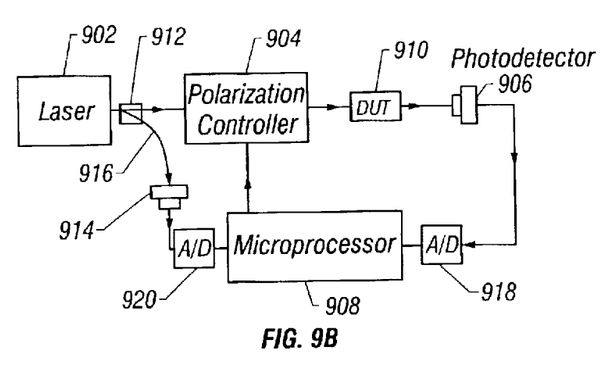

A particularly suitable application for the described fiber squeezers is in polarization dependent loss (PDL) measurement equipment. The PDL of an optical component is defined as the difference between the maximum and the minimum insertion losses for all possible input states of polarization (SOP). FIGS. 9A and 9B show simple PDL meters that include a stable laser source 902, a polarization controller 904, a photodetector 906, and a microprocessor or a control circuit 908. A device under test (DUT) 910 is inserted between polarization controller 904 and photodetector 906. In a first measurement, control circuit 908 adjusts polarization controller 904 to minimize light loss in DUT 910 and thus maximize the optical power reaching photodetector 906. In a second measurement, microprocessor 908 adjusts polarization controller 904 to maximize light loss in DUT 910 and thus minimize power reaching photodetector 906. The PDL of DUT 910 can be calculated as:

$PDL = 10 log(\text{first measurement/second measurement})$

Figure 10A:
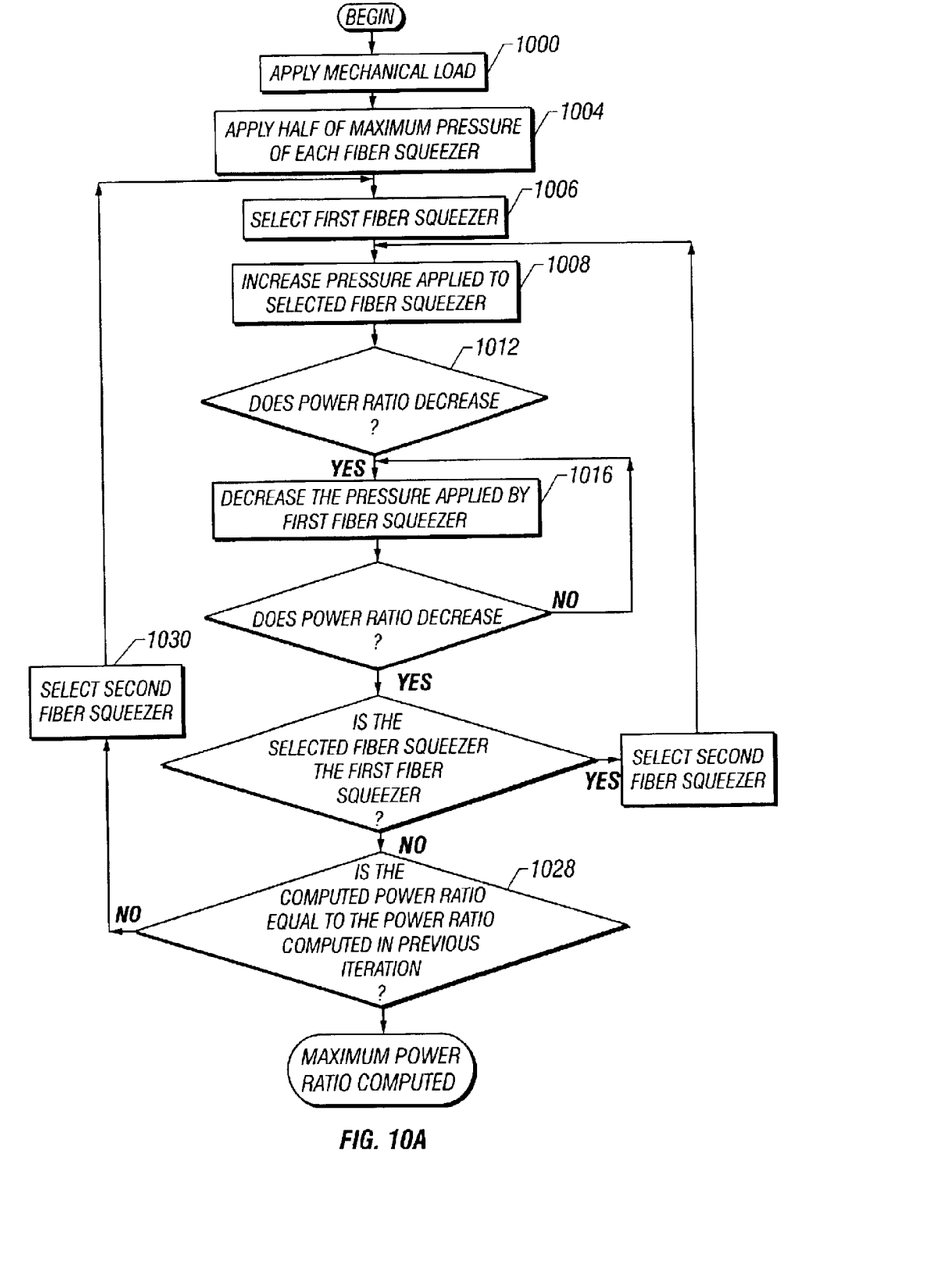
FIGS. 10A and 10B show flow charts that describe a method of using fiber squeezer polarization controllers in the system of FIG. 9B.
Figure 10B:
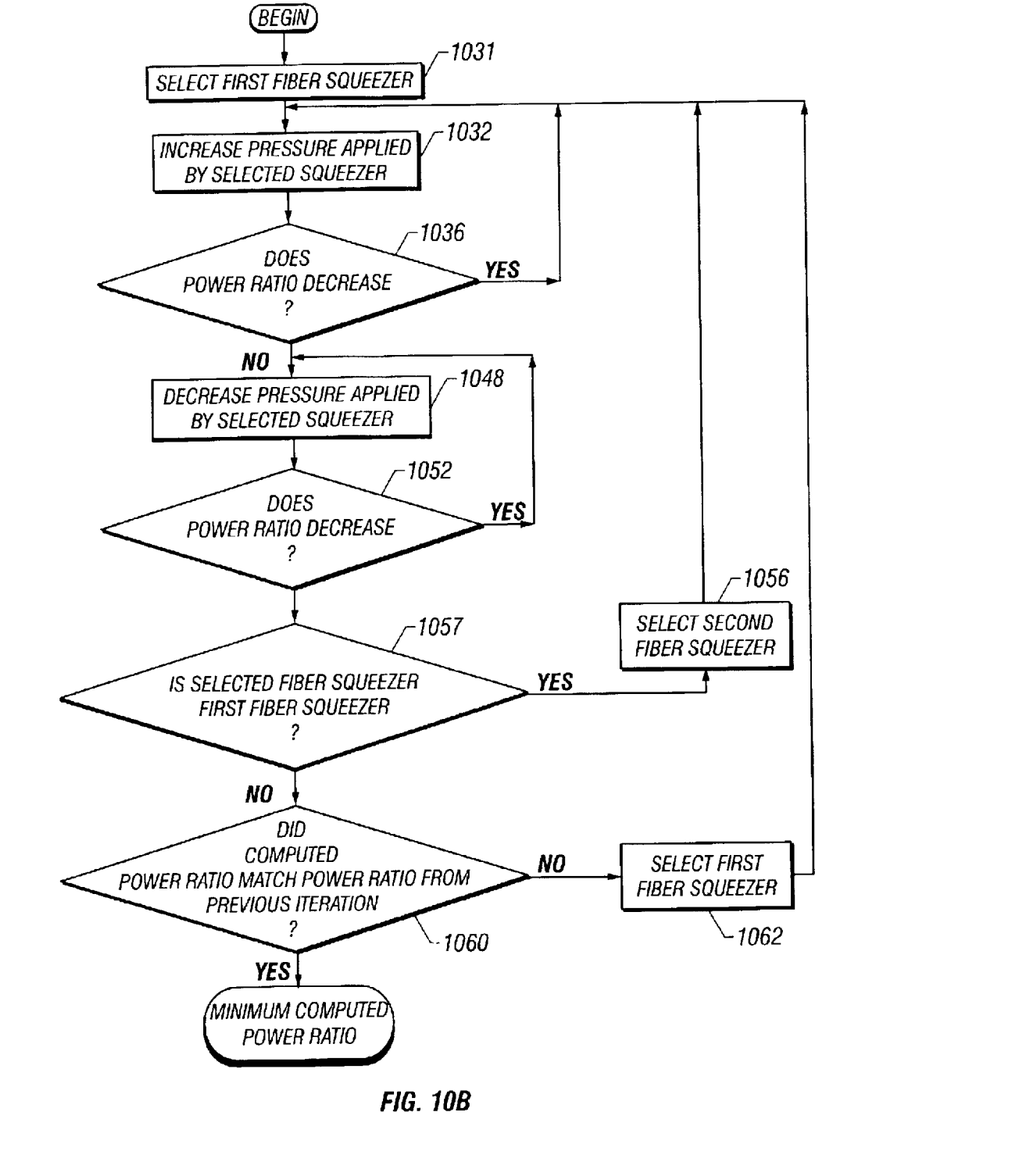

A major source of PDL measurement error arises from laser source 902 instability. FIG. 9B shows a PDL measurement system that minimizes inaccuracies resulting from laser source instability. The system of FIG. 9B includes a coupler 912 inserted between the laser source and the polarization controller. A second photodetector 914 connects an output port 916 of coupler 912 to monitor the laser power fluctuation. A/D convertors 918, 920 digitize the outputs of first photodetector 906 and second photodetector 914. Control circuit 908 computes the ratio of the two powers using the digitized outputs of photodetectors 914, 906. The computed ratio is independent of the laser power. FIG. 10 describes the process of obtaining the maximum power ratio Rmax and the minimum power ratio Rmin. These power ratios are used to compute the PDL using the equation $PDL = 10 log(Rmax/Rmin)$.

A second factor that limits PDL measurement accuracy of the test is the activation loss and the PDL of the polarization controller. The low activation loss and the low PDL of fiber-squeezer based polarization controllers makes such controllers especially attractive for use in PDL measurements.

Figure 9C:
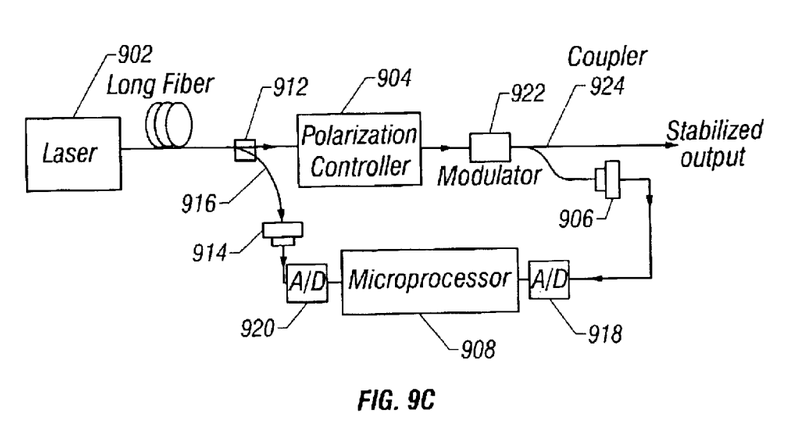
FIG. 9C shows one embodiment of a system to stabilize the state of polarization of light passing through a component with polarization dependent loss using fiber squeezer polarization controllers.

The same configuration can also be used to stabilize the SOP of the light passing through a high PDL component 922, such as a LiNbO3 modulator or a polarizer, as shown in FIG. 9C. Microprocessor 908 is then programmed to maintain a maximum power in photodetector 906 or to maintain a maximum power ratio Rmax (power received in 906 over power received in 914).

Software may be written to program control circuit 908. One method of programming control circuit 908 to control fiber squeezer polarization controllers is described in the flow charts of FIGS. 10A and 10B. In block 1000, a fixed mechanical load is applied to the fiber squeezer to induce a birefringence in the fiber. The load induces birefringence even when no voltage is applied to the piezoelectric controlling the fiber squeezer. In block 1004, an initial voltage equal to half the available or maximum voltage range is applied to each fiber squeezer.

To obtain the maximum power ratio, the control circuit, such as a microprocessor, changes the voltage applied to a piezoelectric of first fiber squeezer. In one embodiment, the microprocessor selects the first fiber squeezer in block 1006 and increases the voltage applied in block 1008. When the increased voltage results in an increased power ratio, the microprocessor continues to increase the applied voltage until the power ratio starts to decrease in block 1012. When an increase in the applied voltage in block 1008 causes the power ratio to drop in block 1012, the microprocessor decreases the applied voltage in block 1016 until the power ratio starts to decrease in block 1018. The power ratio computed is stored and the process repeated on the second fiber squeezer in block 1020 to maximize the received power ratio. When, in block 1028, the stored power ratio and the recently computed power ratio do not match, the first fiber squeezer is selected in block 1030 and the process of adjusting the first fiber squeezer and subsequently the second fiber squeezer described in blocks 1004 to block 1020 is repeated until the power ratio no longer changes in block 1028. When no further power changes occur, the maximum received power ratio has been reached.

After computing the maximum power ratio, the microprocessor computes a minimum power ratio using an analogous procedure. The microprocessor alters the voltage applied to the first fiber squeezer piezoelectric in block 1032. For purposes of illustration, an increase in the applied voltage is assumed. When the increased voltage results in a decreasing power ratio in block 1036, the microprocessor continues to increase the voltage in block 1032 until the power ratio starts to increase 1044. When an increase in applied voltage in block 1032 causes the power ratio to rise in block 1036, then the microprocessor decreases the applied voltage in block 1048 until the power ratio starts to increase in block 1052. After the first fiber squeezer, the second fiber squeezer is selected in block 1056 and the process described in block 1032 to 1052 is repeated on the second fiber squeezer to minimize the received power ratio. In block 1060, the power ratio from the most recent iteration is compared with the power ratio computed in a previous iteration. When the comparison does not match, process of adjusting the first fiber squeezer and subsequently the second fiber squeezer described in blocks 1032 to block 1056 is repeated until the power ratio no longer changes in block 1060. When no further power changes occur, the minimum received power ratio has been reached in block 1064.

While the Applicant has described various embodiments of the polarization controller and/or scrambler system other embodiment may be apparent to one of ordinary skill in the art. For example, although Applicant has specified particularly dimensions, such as particularly thicknesses of polyimide coating, other dimensions and thicknesses may also be used and still fall within the scope of the invention. Uses for the fiber squeezer also should not be limited to the particular systems described. Other uses of the fiber squeezers include, but are not limited to, fiber squeezer phase modulators and fiber squeezer polarization rotators. Thus the invention should not be limited to merely the embodiments described in the preceding specification. Rather, the limitations of the invention should only be limited by the claims which follow and equivalents thereof.

I claim:

1. A method of controlling polarization comprising:
   filling micro-cracks in a fiber with a compound;
   receiving light in the fiber;
   determining a desired polarization state;
   applying a transverse compressive force to a first length of the fiber including the micro-crack filling compound to induce a birefringence that alters a polarization of the light to the desired polarization state.

2. The method of claim 1 wherein the micro-cracks are less than 1 microns in width.

3. The method of claim 1 wherein the compound is polyimide.

4. The method of claim 1 wherein the compound is one of the group of chlorinated polydimethylsiloxane, monometric octadecylsilane, b-chloroethylsilsesquioxane, and methylsilsesquioxane.

* * * * *